US005306983A

United States Patent [19]

Lehner

[11] Patent Number: 5,306,983

[45] Date of Patent: Apr. 26, 1994

[54] SUPPORT DEVICE FOR A PICTURE TUBE COMPONENT

[75] Inventor: Heinz Lehner, Oberschneiding, Fed. Rep. of Germany

[73] Assignee: Nokia (Deutschland) GmbH, Pforzheim, Fed. Rep. of Germany

[21] Appl. No.: 771,846

[22] Filed: Oct. 3, 1991

Related U.S. Application Data

[63] Continuation-in-part of Ser. No. 545,351, Jun. 27, 1990, abandoned.

[30] Foreign Application Priority Data

Jul. 13, 1989 [DE] Fed. Rep. of Germany ....... 3923110

[51] Int. Cl.⁵ ....................... H01J 29/02; H01J 29/70; F16B 35/04

[52] U.S. Cl. .................................... 313/482; 313/440; 411/417

[58] Field of Search ............... 313/482, 456, 402, 404, 313/406, 157, 158, 438, 440; 358/248, 249; 335/210, 212; 411/417, 418

[56] References Cited

U.S. PATENT DOCUMENTS

| | | | |
|---|---|---|---|
| 1,451,970 | 4/1923 | Taylor | 411/418 |
| 3,781,730 | 12/1973 | Salners | 335/210 |
| 3,831,123 | 8/1974 | Aldrich et al. | 335/210 |
| 3,986,156 | 10/1976 | Smith | 335/210 |
| 4,016,363 | 4/1977 | Deal et al. | 358/248 |
| 4,110,793 | 8/1978 | Tajiri | 358/248 |
| 4,117,516 | 9/1978 | Yasuhara | 358/248 |
| 4,285,013 | 8/1981 | Brunn et al. | 358/248 |
| 4,338,584 | 7/1982 | Howard | 335/210 |
| 4,687,966 | 8/1987 | Carroll et al. | 313/440 |

FOREIGN PATENT DOCUMENTS

| | | | |
|---|---|---|---|
| 1014454 | 7/1977 | Canada | 411/417 |
| 2451288 | 5/1975 | Fed. Rep. of Germany . | |
| 2641847 | 3/1978 | Fed. Rep. of Germany . | |
| 2814575 | 10/1979 | Fed. Rep. of Germany . | |
| 3010262 | 9/1981 | Fed. Rep. of Germany . | |
| 3106900 | 9/1982 | Fed. Rep. of Germany . | |
| 1025076 | 4/1966 | United Kingdom | 358/248 |
| 1586100 | 3/1981 | United Kingdom . | |

OTHER PUBLICATIONS

Soviet Inventions Illustrated–Section E1: Electrical Derwent Publications, Ltd.–London (1987).

*Primary Examiner*—Sandra L. O'Shea

[57] ABSTRACT

A support device for a deflection unit (10) for a picture tube comprises pins (17) which in a longitudinal direction carry a thread (19) over part of their circumferences. The pins run in guide bores, which are constructed so as to exhibit a recess of not less than the angular circumference of the thread. Each pin is at first so aligned in relation to the associated guide bore that the thread runs in the above-mentioned recess. In this position (after the deflection unit has been aligned), each pin is pushed until it contacts the tube cone (18.K). Then each pin is turned by 90°, thus ensuring that the above-mentioned thread cuts into the non-recessed wall of the guide bore. This ensures that each pin is fixed in position, and simultaneously, due to the lead of the thread, a tension is set between deflection unit and tube. The support device thus constructed has the advantage that the tension force between the deflection unit and the tube cone can be set precisely. This insures that the optimum setting is not lost due to different tension forces acting at the locations of the different support elements, as was the case when conventional support elements were used.

10 Claims, 3 Drawing Sheets

SUPPORT DEVICE FOR A PICTURE TUBE COMPONENT

This is a continuation-in-part of copending application Ser. No. 07/545,351 filed on Jun. 27, 1990 now abandoned.

TECHNICAL FIELD

The invention relates to a support device for a picture tube component, especially for a deflection unit. Generally, the deflection unit is clamped in position with the aid of a clamping ring at the neck of the picture tube, and it is supported on the tube cone with the aid of the support device.

PRIOR ART

As soon as a deflection unit already firmly linked to the neck of the picture tube is aligned so as to ensure that imaging characteristics are satisfactorily provided within specified tolerances, the unit must be fixed in the position reached on the tube. In the current state-of-the-art, this is achieved either by turning screws mounted in a retainer part until they are flush against the tube cone, or by pushing wedges between the above-mentioned retainer part and the tube cone. In both methods of fastening, it has turned out to be difficult to perform this fixing procedure so as to ensure that the set position of the deflection unit is retained. It must be noted that the deflection unit is firmly mounted inside the aligning unit, as is the picture tube. If now an operator tightens one of the above-mentioned screws more than the others, then the retainer part will move somewhat out of true, thus causing an elastic force to build up, which relaxes when the tube with the fixed deflection unit is removed from the aligning unit. There is a similar effect when one of the fixing wedges is pressed more firmly between cone and retainer part than the others.

Both when using screw-shaped support elements and wedge-shaped support elements, it is accordingly not assured that the aligned position of the deflection unit will be retained when this is released from the aligning device.

The long-standing problem was accordingly to provide a support device for a deflection unit for a picture tube constructed so as to ensure that the deflection unit does not alter its position when, after being fixed on the picture tube inside an aligning device, it is removed from this device.

SUMMARY OF THE INVENTION

The support device described in this invention is characterized by the fact that each support element can be moved in the support direction inside a mounting, and that inside this mounting it can be arrested in more than one setting position. A support device of this kind is especially suited for adjusted retention of a deflection unit, but can also be used for adjusted retention of a magnetic multipole unit, for example.

In order to illustrate the advantages of the invention, let it be assumed that the support element is a pin, which is guided in a mounting aligned on the picture tube, and can be glued in the bore in any desired setting position. If, after this desired alignment has been achieved, this pin is moved so as to arrive flush against the picture tube, the pressing force onto the pin does not affect in any way the retainer part of the deflection unit, since the pin can be moved freely in the bore in the retainer part. It is not until the pin has been glued in the bore that it can transmit a force between picture tube and deflection unit. If, however, the pin is essentially inelastic, then even after gluing no misadjusting force will be exerted.

The fact that a force between picture tube and deflection unit can only be a force resulting from an elastic deformation of the moved pin can be utilized in order to selectively set a tension force between picture tube and deflection unit. If, for example, the pin exhibits at its front end contacting the picture tube a cap made of elastic material, this latter will be deformed in dependence on the pressing force of the pin onto the tube. This pressing force can be designed to be relatively uniform, so that at all support points the same tension force is exerted, thus ensuring that the alignment position achieved is retained unaltered. Such a relatively precise adjustment of a prestressing force was not possible when using conventional support elements. When conventional screws were used, these would all have to be tightened with the same torque, and it would have to be ensured that the torque is not affected by friction, but is dependent only on the prestressing force being achieved. This condition is in practice never satisfied, since the parts used are made of plastic, meaning that some screws are very easy to turn, and some very difficult. The torque is thus substantially determined by friction, and for this reason identical torques will not produce identical prestressing forces. The situation is similar when conventional wedges are used; with the aid of a relatively slight thrust force, a wedge can enable a relatively high prestressing force to be achieved. However, when identical thrust forces are applied to different wedges, the result will be different tension forces, since the thrust force is highly dependent on the friction of the wedge between itself and the picture tube and itself and the retainer part. It must also be noted that in practice wedges with different angles are used, in order to bridge different distances between deflection unit and picture tube at different points. Even given identical friction forces and identical thrust forces, there will be different tension forces when wedges with different angles are used.

On the other hand, as already explained, the tension force when an elastic pin is used depends solely on the pressing force used, provided that there is no very great friction between pin and bore. The latter phenomenon can be easily prevented, however, since it is not of the slightest importance whether the pin fits snugly in the bore.

For quick attachment of a support element in the mounting, it is of especial advantage when the support element and the mounting possess catches which permit the support element to move only towards the picture tube. Here the component is fixed in position when the adjustment end position is reached. However, between different fixing positions there is a travel difference (depending on the lock function), which may easily lead to slightly differing tensions.

It is most especially advantageous when the support element is constructed in the form of a pin, which in a longitudinal direction carries a thread over a part of its circumference, and when the guide is constructed so as to exhibit a recess of not less than the angular circumference of the thread. As long as the support element is seated in the guide so as to ensure that the partial thread is running in the recess, it can be moved to and fro in the guide with a very slight force. Once it has been moved into the desired position, it merely needs to be turned a little, in order to be fixed in position in relation to the guide. Depending on the lead of the thread, the pin, when turned for fixing purposes, will be given a further forward movement in relation to the guide, by a specified amount. In this way a precisely defined tension can be set, depending solely on the lead of the thread and the turning angle used.

SHORT DESCRIPTION OF THE DRAWINGS

FIG. 1: Side view of a deflection unit fixed in position of a picture tube (only partially depicted);

FIG. 2: Plan view of the deflection unit in accordance with FIG. 1;

FIG. 3: Side view of a pin-shaped support element with partial thread;

FIGS. 4A and 4B: Cross-sections through a guide with a pin in accordance with FIG. 3, once in the adjustment-movement position (FIG. 4A) and once in fixing position (FIG. 4B);

FIG. 5: Longitudinal section through a guide with a moving pin with catches; and FIG. 6: Longitudinal section through a guide with a pin which can be glued inside the guide.

DETAILED DESCRIPTION OF THE PREFERRED EMBODIMENTS

Figure 1:
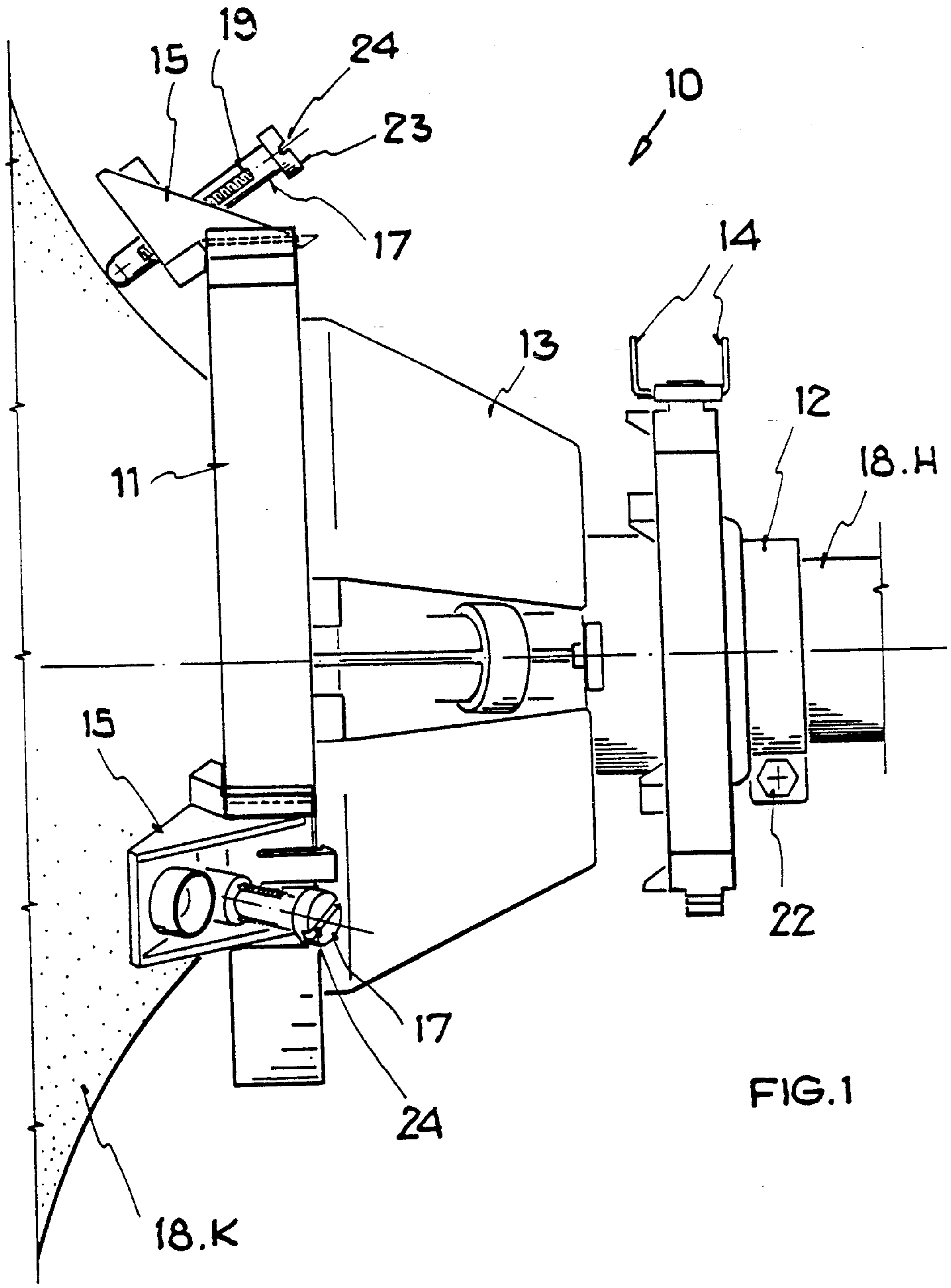
Figure 2:
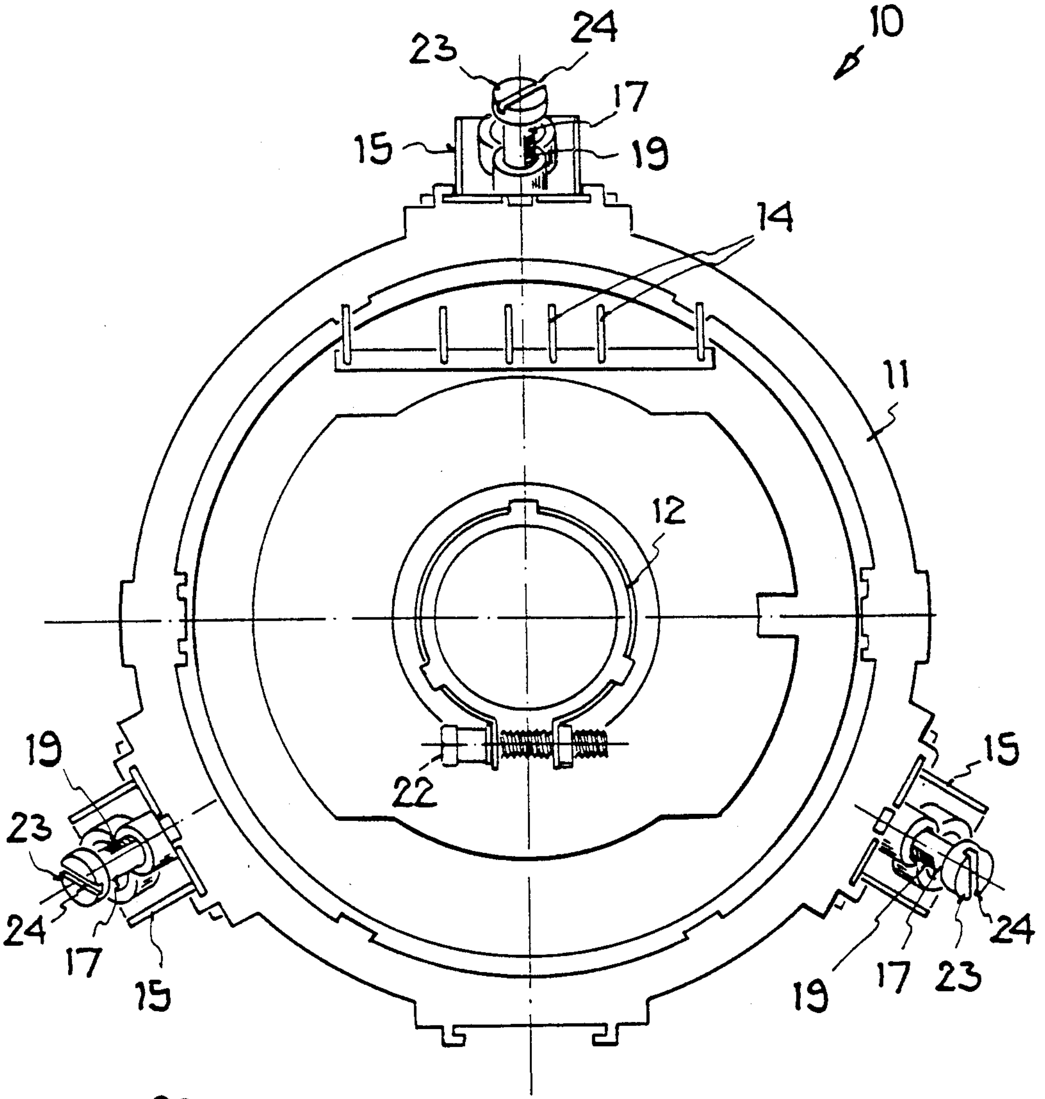

The deflection unit (10) in accordance with FIGS. 1 and 2 comprises a retainer part with a front retaining ring (11) and a rear clamping ring (12). The retainer part carries a (diagrammatically depicted) deflection winding (13) and contacts (14).

At the circumference of the retaining ring (11), there are three support feet (15) under identical angular distances. Each support foot (15) possesses a guide bore (16) (FIG. 4), with a pin (17) mounted inside it. Each pin (17) acts as a support element for supporting the deflection unit (10) on the cone (18.K) of the tube. At the tube neck (18.H), the deflection unit is attached with the aid of the clamping ring (12). The construction of the pins (17) and the associated guide bores (16) can be seen in FIGS. 3 and 4. Each pin (17) possesses in a longitudinal direction two partial threads (19), each of which extends over a part of the pin's circumference and a non-threaded surface 19*a*. The tips of the threads exhibit a larger circumference than the rest of the pin, which is constructed without a thread. This can be seen especially clearly in FIG. 4A. The guide bore (16) exhibits two recesses, which match the partial threads (19) and are constructed so as to ensure that the pin (17) can be moved inside the guide bore (16) quite easily when it is inserted into the bore in such a way that the partial threads (19) are aligned with the recesses (21), and the non-threaded surface 19*a* is aligned with the non-recessed surface 21*a*, as shown in FIG. 4*a*. In this position (4A), each pin (17) can be moved to and fro at will in the associated guide bore, and especially until contacting the tube cone (18.K). If the pin (17) is turned by 90°, the partial thread (19) cuts into the non-recessed parts of the wall of the guide bore (16). This ensures that the pin (17) is fixed in position in the guide bore (16), and simultaneously it is moved by a small distance, depending on the direction of turn, the angle of turn, and the lead of the thread concerned.

In order to fix a deflection unit in position on a picture tube, the following procedure is adopted, with the aid of support elements constructed to the above design. First of all, the deflection unit is pushed in the conventional manner over the picture tube neck (18.H), and then attached in a specified longitudinal position at the tube neck by tightening a clamping screw (22) at the clamping ring (12). Then the tube and the deflection unit (10) are contacted, and in operation of these components the deflection unit (10) is adjusted with the aid of an adjuster device until imaging characteristics are within specified tolerances. In the aligned position, the deflection unit (10) now has to be permanently fixed. It is here that the pins (17) described above come into use; in the position shown in FIG. 4A, they are pushed against the tube cone (18.K). For forces operating between deflection unit (10) and tube cone (18.K), it is immaterial how strong the pressing forces on the pins (17) are, or in particular whether the forces are identical at all pins or not. When a particular pin (17) is moved against the tube cone (18.K), it is then turned by 90° into the position shown in FIG. 4B, with the turn being performed in the direction causing a further forward movement onto the tube cone relative to the deflection unit (10). This turning movement fixes the pins (17) in position, simultaneously causing the adjusted position of the deflection unit (10) being fixed as well. Due to the small forward movement of the pins during fixing, a small tension is achieved between deflection unit (10) and tube, resulting in an especially secure seat of the deflection unit (10). The adjusted position is not altered thereby. The extent of the tension, given a fixed turn of 90° in all cases, depends only on the lead of the thread, meaning that it can be specified by this latter.

Figure 3:
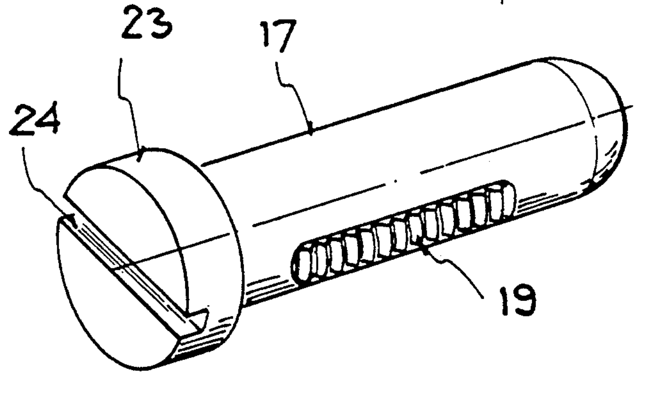
Figure 4A:
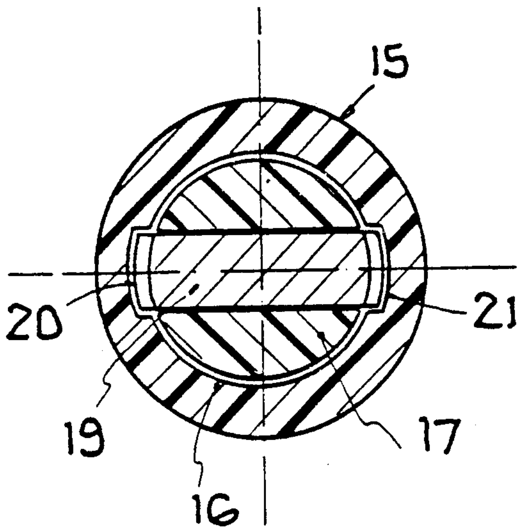
Figure 4B:
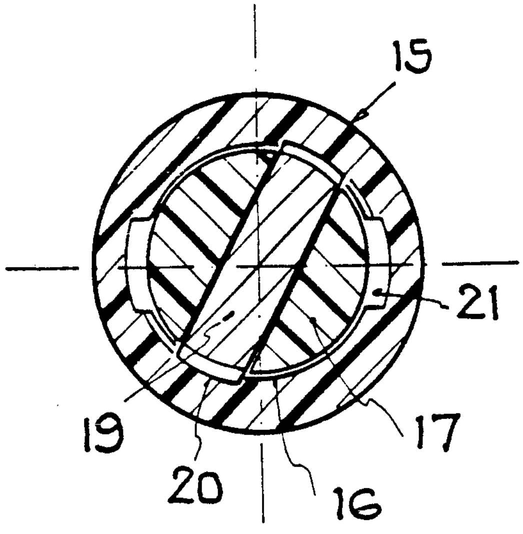

The pins (17) shown in FIGS. 1-3 carry a widened head with a slit (24) for turning purposes. However, it is not necessary for there to be a widened head, and instead of a slit, for example, an outer or inner multi-cornered configuration can be provided. In addition, the pin can be modified so that instead of two partial threads (19) more or fewer partial threads are provided. If only one partial thread is provided, the advantage is that when fixing in position, for example, the pin can be turned by 270°, in order to achieve an especially great fixing tension, if this should be necessary.

Figure 5:
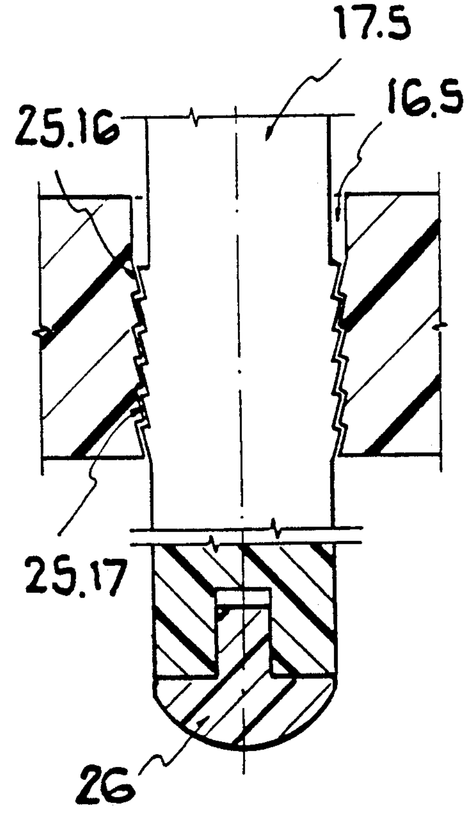

The pin (17.5) and the guide bore (16.5) in accordance with FIG. 5 carry catches (25.17 and 25.16 respectively), which are aligned so as to ensure that they permit the pin (17) to move towards the picture tube cone (18.K). At its front end, the pin (17.5) is fitted with a rubber cap. When the deflection unit is being fixed in position, the pin is pressed against the tube cone with a specified force, thus compressing the rubber cap (26) somewhat. The longitudinal-movement position of the pin (17.5) in the guide bore (16.5) is determined by the locking function achieved in each case. When the deflection unit is released by the aligning device, the elastic deforming force of the rubber cap (26) ensures that the deflection unit is braced with a specified force against the tube.

Figure 6:
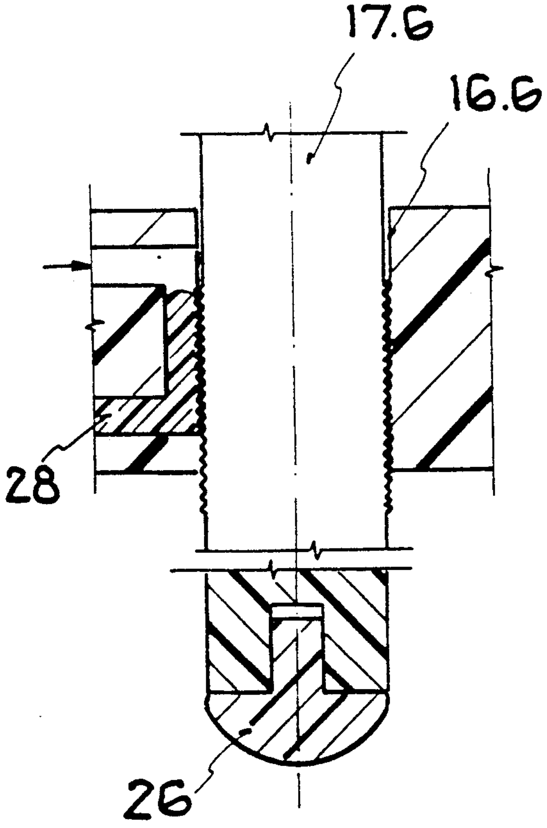

Pins having a rubber cap (26) as shown in FIGS. 5 and 6 and threads (19) as shown in FIG. 3 but with a zero pitch can be used to practice the invention. In such a case the pins are inserted into the guides and are pressed against the tube cone with a specified force so that the caps compressively engage the tube cone. The pins are then rotated so that the zero pitch threads engage the surface of the guide and fix the pins in a position with the rubber cap compressed. In this manner the specified force is exerted on the tube by the rubber caps so that the deflection unit is securely seated.

In the embodiment shown in FIG. 6, a pin (17.6) with grooves (27) is provided. The associated guide bore (16.6) possesses an adhesive channel (28) formed in the surface of the guide bore and having a width that exposes only a portion of the circumference of said pin for gluing the grooved pin (17.6) when this latter has been pushed as far as the picture tube cone. The grooved pin (17.6) is also at its front end fitted with a rubber cap (26) for the purpose explained above. An adhesive channel (28) and glue can also be used in conjunction with threaded pins to provide a more secure fixation of the pins.

The embodiments relate to designs of guide bores and pins which are matched to each other so as to ensure that the pins can be moved inside the guide bore without exerting great force, but can be fixed in more than one adjustment positions, preferably in any desired adjustment position, in relation to the guide. Combinations of guides and pins with these characteristics can be produced in many further embodiment forms, e.g. also in dowel-like embodiment forms, i.e. with configurations in which a wedge is driven into the pin after the latter has been pushed forward as far as the tube cone, in order to expand the pin and thus to clamp it in the guide. It is advantageous to slit the pin for such a purpose.

The pins shown in the embodiments are additionally so constructed that they enable a specified tension to be achieved between deflection unit and tube cone. A tension of specified size can, however, also be implemented by ensuring that the support feet (15) are withdrawn by the aligning device with a specified force while the pins are being pushed forward to the tube and while they are being fixed in position. After the deflection unit has been released by the aligning device, the elastic restoring force of the support feet (15) ensures the desired tension force. Pins having zero pitch threads are particularly useful in this case. It must be pointed out that it is not necessary for three support feet (15) to be provided in the deflection unit; a different number may also be possible.

The embodiment relates solely to a deflection unit. Pins which can be moved and arrested in the manner described can, however, also be used to retain other components in the position adjusted, e.g. for magnetic multipoles, of the type used for setting convergence and colour purity, for example. In an application of this sort, the pins can be supported on the tube neck, or on the deflection unit in front of it.

I claim:

1. Support device for a picture tube components (10), with more than one support element, characterized in that each support element (17, 17.5, 17.6) comprises a pin (17, 17.5, 17.6) that can be freely moved in the support direction, inside a guide (16, 16.5, 16.6) having a smooth inner surface, and can be arrested in any position inside this guide (16, 16.5, 16.6), said pin (17, 17.5, 17.6) having a thread (19) extending in a longitudinal direction over a part of its circumference and said guide (16, 16.5, 16.6) having a recess (21) of not less than the angular circumference of the thread (19), whereby the thread (19) may fit in the recess (21) to allow free longitudinal movement of the pin (17, 17.5, 17.6) in the guide (16, 16.5, 16.6) to any desired arresting position where the pin (17, 17.5, 17.6) can be locked by rotation so that the thread (19) engages the inner surface of the guide (16, 16.5, 16.6).

2. Support device in accordance with claim 1, wherein the pin includes an elastic end cap for compressively engaging said picture tube.

3. Support device in accordance with claim 1, wherein the thread has a predetermined pitch.

4. Support device in accordance with claim 1, wherein the thread has zero pitch.

5. Support device in accordance with claim 4, wherein said pin includes an elastic end cap for compressively engaging said picture tube.

6. Support device for a picture tube components (10), with more than one support element, each support element (17, 17.5, 17.6) comprising a pin (17, 17.5, 17.6) that can be freely moved in the support direction, inside a guide (16, 16.5, 16.6) having a smooth inner surface, and can be arrested in any position inside this guide, said pin (17, 17.5, 17.6) having a thread (19) extending in a longitudinal direction over a part of its circumference and said guide (16, 16.5, 16.6) having a recess (21) being not less than the angular circumference of the thread so that the thread (19) may fit in the recess (21) to allow free longitudinal movement of the pin (17, 17.5, 17.6) in the guide (16, 16.5, 16.6) to any desired arresting position where the pin can be locked by rotation so that the thread (19) engages the inner surface of the guide (16, 16.5, 16.6).

characterized in that each guide (16.6) comprise an adhesive channel (28) formed in the smooth inner surface for introduction of adhesive for gluing a pin (17.6) in the guide (16.6).

7. Support device in accordance with claim 6, wherein the adhesive channel has a width that exposes only a portion of the circumference of said pin.

8. Support device for a picture tube component (10), with more than one support element, characterized in that each support element (17.6) comprises a pin that can be freely moved in a support direction, inside a guide (16.6) having an inner surface, and can be arrested in any position inside said guide, said pin having grooves (27) over at least a part of its circumference and said guide (16.6) having an adhesive channel (28) formed in the inner surface for the introduction of adhesive for gluing the pin (17.6) in the guide.

9. Support device in accordance with claim 8, wherein the adhesive channel has a width that exposes only a portion of the circumference of said pin.

10. Support device in accordance with claim 8, wherein the pin includes an elastic end cap for compressively engaging said picture tube.

* * * * *